3,335,138
PROCESS FOR MAKING ETHIONIC ACID AMIDES BY REACTING AN ETHIONIC ANHYDRIDE (A CARBYL SULFATE) WITH AN AMINE IN THE PRESENCE OF WATER
Rudolf Kühne, Helmut Diery, and Max Grossmann, Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 9, 1965, Ser. No. 447,097
Claims priority, application Germany, July 19, 1961, F 34,468; Mar. 2, 1962, F 36,169
3 Claims. (Cl. 260—247.1)

The present invention provides novel nitrogen-containing compounds and processes for preparing them.

This application is a continuation-in-part application of application Ser. No. 210,564, filed on July 17, 1962, by Rudolf Kühne et al. for "Nitrogen-Containing Compounds and Process for Preparing Them," and now abandoned. We have found that novel nitrogen-containing compounds can be prepared by reacting carbyl sulfate or compounds which contain the carbyl sulfate ring

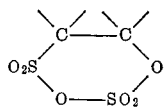

with primary or secondary, aliphatic, cycloaliphatic, araliphatic or hydrogenated heterocyclic amines whose amino groups have aliphatic nature. The new compounds contain at least one ethionylamino group and correspond, in acid form, to the formula

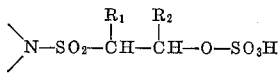

in which the substituents $R_1$ and $R_2$ each represent hydrogen, alkyl, halogenalkyl or a phenyl radical substituted by negative ligands; in the last-mentioned case only one of the substituents $R_1$ and $R_2$ may be such a phenyl radical. Further, $R_1$ and $R_2$ may form a saturated ring. The number of introducible ethionylamino groups depends on the number of amino groups of the amine used as the starting material.

The amines which may be used for the process of the present invention may be primary or secondary, aliphatic, cycloaliphatic or araliphatic amines. The alkyl substituents of the aliphatic amines may be straight chain or branched. In addition thereto, they may also contain double bonds or substituents, for example, halogen atoms or hydroxyl groups. As branched chain amines, there may be used those obtained by the reaction of branched olefins, for example, diisobutylene, tripropylene, and tetrapropylene, with hydrocyanic acid in the presence of sulfuric acid and subsequent saponification of the N-formylamines formed. As examples, there are mentioned: methylamine, isobutylamine, n-hexylamine, 2-ethyl-hexylamine, dodecylamine, coconut oil alkylamine, stearylamine, oleylamine, dimethylamine, diethylamine, dibutylamine, didodecylamine, N-methylstearylamine, montanic acid alkylamine, allylamine, β-methylaminopropionitrile, β-n-butylaminopropionitrile, monoethanolamine, isopropanolamine, diethanolamine, di - (3 - hydroxypropyl) - amine, cyclohexylamine, hexahydrotoluidine, dicyclohexylamine, benzylamine, β-phenyl-ethylamine, N-methylbenzylamine, and dibenzylamine.

In addition to the amines of the above-mentioned classes, there may also be used in the reaction according to the present invention amines in which the nitrogen atom of the amino group is a part of a hydrogenated heterocyclic ring system and in which the amino group behaves like the amino group of an aliphatic amine. Examples of such heterocyclic hydrogenated compounds are: piperidine, morpholine, 1,2,3,4 - tetrahydroisoquinoline, and piperazine.

In addition to the primary or secondary monoamines, also polyamines may be used in the process of the present invention. As such polyamines, there may be used compounds in which the amino groups are adjacent to one another, thus, α,β-diamines, or compounds in which the amino groups are farther apart from one another in the molecule or are even in the terminal position, thus α,ω-diamines. Examples of such compounds are: ethylenediamine, 1,2-diaminopropane, 1,6-diaminohexane, N-dodecyl - 1,3 - diaminopropane, N - stearyl - 1,3 - diaminopropane, and 4,4' - diamino - dicyclohexylmethane. Further, there may be used as polyamines polyalkylenepolyamines, thus polyamines in which the hydrocarbon radical is interrupted by NH— groups. Examples of such compounds are: diethylenetriamine, triethylenetetramine, tetraethylenepentamine, dipropylenetriamine, and the analogous propylenepolyamines or butylenepolyamines. Further, the following polyamines may also be used in the process of the present invention: bis-N,N'-(γ-aminopropyl)-ethylenediamine, spermin, the polyethylene-polyamines obtained, for example, by the polymerization of ethyleneimine or 2-methylethyleneimine.

The process can be generally used for reacting aliphatic amines with compounds that contain the carbyl sulfate ring. Thus, beside carbyl sulfate, also the carbyl sulfate prepared from methallyl chloride and $SO_3$ can be reacted with aliphatic amines according to the present invention.

The substituted carbyl sulfates are prepared by known methods from the corresponding olefins and sulfur trioxide.

Thus, methyl-carby sulfate is prepared by introducing propylene into a solution of liquid sulfur trioxide in liquid sulfur dioxide at a temperature ranging from —15° C. to —20° C. After removal of the sulfur dioxide by distillation, methyl-carbyl sulfate remains behind in the form of a solid residue which can be recrystallized from ethylene chloride.

If instead of propylene, freshly distilled allyl chloride is added dropwise, chloromethyl-carbyl sulfate is obtained after separation of the sulfur dioxide by distillation; it is purified by recrystallation with intense cooling from a small quantity of ethylene chloride; it is finally obtained in the form of a crystalline powder.

Analogously, when using allyl bromide, there is obtained the bromoethyl-carbyl sudfate. The compound can likewise be recrystallized from ethylene chloride.

As substituted carbyl sulfates, there are mentioned by way of example: methyl-carbyl sulfate, dimethyl-carbyl sulfate (from butene-2), n-butyl-carbyl sulfate, n-decyl-carbyl sulfate, chloromethyl-carbyl sulfate, bromomethyl-carbyl sulfate, p-nitrophenyl-carbyl sulfate, chlorophenyl-carbyl sulfate.

The reaction of the carbyl sulfates with the amines, which takes place in the presence of acid-binding agents, may be carried out in an organic solvent or in water as the reaction medium. As organic solvents, there are used preferably chlorinated low molecular aliphatic hydrocarbons or chlorinated aromatic hydrocarbons and such solvents as have a high dipole moment and are miscible with water. Examples of such solvents are: methylene chloride, ethylene chloride, dichlorobenzene, acetonitrile, and nitrobenzene. When operating with an organic solvent, first the carbyl sulfate is introduced and then the amine is added to the reaction mixture, or the amine may be introduced first and then the carbyl sulfate, in solid form or as a solution, is added.

In view of the sensitivity of carbyl sulfates to moisture, it must be considered very surprising that the process of the present invention, i.e. the reaction of the indicated primary or secondary amines with aliphatic nature with carbyl sulfates, may even be carried out in the presence of water, and that it yields in such a smooth reaction the final products which contain the ethionylamino group, either once or several times. Operation in such an aqueous medium or in water is preferred when metal salts of the compounds are to be prepared. In this case, it is advantageous to use mineral bases as the acid-binding agents, in particular those which are derived from alkali metals, for example, alkali metal hydroxides such as sodium hydroxide or potassium hydroxide, alkali metal bicarbonates or alkali metal carbonates such as sodium carbonate, sodium bicarbonate, potassium carbonate, potassium bicarbonate; alkali metal borates, alkali metal silicates, and alkali metal phosphates are also suitable.

Alkaline earth metal salts or other metal salts are advantageously prepared by double reaction of the alkali metal salts with alkaline earth metal salts or other metal salts.

The mineral bases used as acid-binding agents may be added in solid form, in aqueous solution or suspension, either before or during the reaction, either in the total amount or in portions, but so that the pH-value required for optimum reaction is always maintained.

If the amines are only sparingly soluble in water or insoluble in water, they are used in emulsified or dispersed form, if required, together with emulsifiers or dispersing agents. As such are suitable ionogenic and non-ionogenic products. Examples thereof are anion-active or cation-active compounds such as alkylaryl sulfonates, alkyl sulfates, and hydroxyethylation products of alcohols or fatty acids.

The carbyl sulfate is added to the solution or dispersion of the amine, advantageously with intensive stirring. The pH-value of the reaction mixture should be maintained between 7 and 14, preferably between 9 and 12, which can be done easily if mineral bases are used as acid-binding agents. A preferred method of operation consists in carrying out the reaction in an organic-aqueous two-phase system, with intensive stirring. The amine of aliphatic nature is mixed with water and a sparingly water-soluble organic solvent, and the carbyl sulfate, either in solid form or dissolved in an organic solvent, is then added.

If alkalies are use as acid-binding agents, the process leads to alkali metal salts, which are obtained in good yields. If alkylammonium salts are to be prepared, it will be preferred, for reasons of solubility, to carry out the reaction in an organic solvent, for example, benzene, ethylene chloride, and acetonitrile. The amine is used in an excess amount, advantageously two mols or more, referred to carbyl sulfate.

The reaction temperatures used are generally in the range of $-20°$ C. and $+100°$ C., preferably in the range from $-5°$ C. and $+60°$ C. If the carbyl sulfate or the reaction products formed are sufficiently thermostable, it may be advantageous for special purposes, especially when working in an organic solvent, to operate at a temperature above the indicated temperature range.

When starting from monofunctional primary or secondary amines that have aliphatic nature, there form, in a smooth reaction, in the presence of acid-binding agents, for example, an excess quantity of the amines used, or in the presence of, for example, mineral bases, compounds which contain the ethionylamino group and which correspond to the following formula

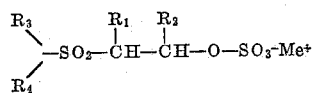

in which $R_1$ and $R_2$ each have the meanings already given, $R_3$ represents hydrogen or an alkyl, cycloalkyl or aralkyl radical, $R_4$ represents an alkyl, cycloalkyl or aralkyl radical, and $R_3$ and $R_4$ together with the nitrogen atom may form a hydrogenated heterocyclic ring system, and Me is an equivalent of the metal of the mineral base used or of the amine in the form of the ammonium ion.

When starting from polyamines which contain primary or secondary amino groups, there form in the presence of alkalies compounds which, as metal salts, contain the ethionylamino group either once or several times.

If the reaction is so conducted that each nitrogen atom enters into reaction with one mole of carbyl sulfate, there are obtained compounds of the following constitution:

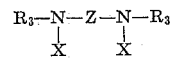

In this formula, X stands for the group of the formula

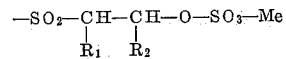

and Z stands for an alkylene radical having two or more carbon atoms, which may be straight chain or branched and contain substitutents which are inert towards carbyl sulfate, for example, $-SO_2-$, $-CONH-$, or $-O-$ groups. The alkylene radical Z may also be interrupted by the one or several secondary N-atoms in which case the hydrogen bound to these nitrogen atoms may be substituted by the radical X. The radical $R_3$ and Me have the meanings already given. The radical $R_3$ may also be linked to form a six-member cycle, if Z contains 1 to 3 carbon atoms, or to a five-membered cycle, if Z represents a radical containing 1 to 2 carbon atoms.

If the reaction of carbyl sulfate with polyamines is carried out without mineral bases, there may be obtained compounds which contain the inner ammonium salt grouping once or several times. Such products can be obtained, for example, when reacting compounds that contain two primary or secondary basic nitrogen atoms with only 1 mol of carbyl sulfate. The compounds correspond to the following formula:

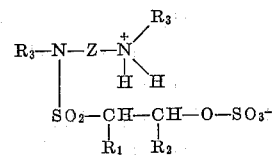

in which the radicals $R_1$, $R_2$, $R_3$, and Z have the meanings given above. If the amine used as starting product contains more than 3 basic nitrogen atoms, the reaction with carbyl sulfate may yield inner polyammonium salts.

The new compounds, which contain ethionylamino groups and which are produced by the process of the present invention, are valuable and novel intermediate products. They offer a large number of reaction possibilities and may thus be used for the preparation of textile auxiliary agents, plastics, pesticides, dyestuffs, and so on. For instance, by reacting the alkali metal salts of the ethionylamino compounds produced according to the present invention and corresponding to the formula

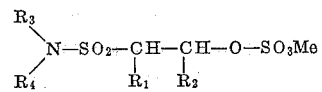

in which $R_1$, $R_2$, $R_3$, $R_4$ and Me have the meanings given above, with compounds of the formula

in which R stands for alkyl, aryl, acyl or the radical

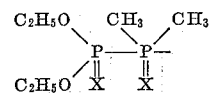

(X=O or S), compounds of the formula

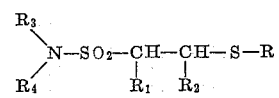

are obtained which, as known from British Patent 845,834 (priority of Nov. 11, 1957), are excellently appropriate as insecticides. The production of said insecticides by starting from the products obtained according to the present invention is much simpler that that disclosed in the above-mentioned British patent according to which β-halogenethylsulfonic acid chlorides and aliphatic amines are used as starting materials which after conversion into vinylsulfonamides are subsequently reacted with R—SH compounds.

The following examples illustrate the invention, but they are not intended to limit it thereto. The parts indicated are by weight unless stated otherwise.

*Example 1*

(a) 38 parts of carbyl sulfate were added, during the course of about 20 minutes at a temperature ranging from 0° to 5°, with intensive stirring, to a mixture of 10.1 parts of n-hexylamine, 50 parts of water, 100 parts by volume of ethylene chloride, and 13.8 parts of potassium carbonate, while keeping the pH-value of the reaction mixture between 10 and 11 by simultaneously adding 86 parts of a potassium hydroxide solution of 26% strength. After termination of the addition of carbyl sulfate, stirring of the reaction mixture was continued for about 30 minutes at the indicated temperature. The precipitated product was filtered off and washed with water and methylene chloride. The potassium salt of N-n-hexylethionic acid amide was obtained in a very pure state and in a very good yield. It could be recrystallized from water.

(b) When working without ethylene chloride and adding the carbyl sulfate dissolved in 80 parts by volume of acetonitrile, but otherwise operating as described under (a), there was likewise obtained the potassium salt of N-n-hexylethionic acid amide, though in a somewhat smaller yield.

(c) On working as described under (a), but with the use of 10.1 parts of n-hexylamine, 200 parts of water, 100 parts by volume of ethylene chloride, and 65 parts of potassium carbonate, and introducing the carbyl sulfate during the course of 15 minutes, there was obtained the potassium salt of N-n-hexylethionic acid amide in an equally good yield and with as good a purity as under (b).

*Example 2*

38 parts of carbyl sulfate were added, during the course of about 20 minutes, at 20° to 25° C. while stirring intensely, to a mixture of 919 parts of cyclohexylamine, 50 parts of water, 100 parts by volume of ethylene chloride, and 13.8 parts of potassium carbonate. By simultaneous addition of 88 parts of potassium hydroxide solution that had a strength of 26%, the pH-value of the reaction mixture was maintained between 10 and 11. After termination of the addition of carbyl sulfate, the reaction mixture was further stirred at 20–25° C. for about 30 minutes, and thereafter cooled to 0° to 5° C.; the precipitated potassium salt of N-cyclohexylethionic acid amide was then filtered off. The salt was dried and washed with chloroform and was found to be after this treatment almost analytically pure. It could be recrystallized from methanol.

*Example 3*

14 parts of carbyl sulfate were introduced, during the course of about 10 minutes, at 0° to 5° C., while stirring intensely, into a mixture of 7.2 parts of the hydrochloric salt of 6-methoxy-1,2,3,4-tetrahydro-isoquinoline, 25 parts of water, 6 parts of potassium carbonate, and 50 parts by volume of ethylene chloride, and, by adding 33 parts of a potassium hydroxide solution that had 26% strength, the pH-value was kept during the reaction between 10 and 11. After the addition of carbyl sulfate, stirring was continued for a further 30 minutes, while the temperature was kept within the range from 0° to 5° C.; the precipitated potassium salt of ethionic acid-(6-methoxy-1,2,3,4-tetrahydro)-isoquinoline was then separated.

*Example 4*

38 parts of carbyl sulfate were added, at 0° to 5° C., while stirring intensely, to a mixture of 12.1 parts of N-methylbenzylamine, 50 parts of water, 100 parts by volume of ethylene chloride, and 13.8 parts of potassium carbonate, and then 59 parts of an aqueous potassium hydroxide solution of 26% strength were added in such a manner that the pH-value of the reaction mixture was kept between 10 and 11. After termination of the addition of carbyl sulfate and potassium hydroxide solution, stirring was continued for about 30 minutes at 0° to 5° C., and then the precipitated potassium salt of N-methyl-N-benzylethionic acid amide was separated. It was obtained in a good yield and in an almost analytically pure state. The salt could be recrystallized from methanol.

*Example 5*

19.0 parts of dodecylamine were dissolved in 130 parts by volume of ethylene chloride, and this solution was stirred into 50 parts of water in which 13.8 parts of potassium carbonate had been dissolved. To this mixture were then added, during the course of 20 minutes, at 20° to 25° C., while stirring intensely, 38 parts of carbyl sulfate; simultaneously, 75 parts of a potassium hydroxide solution of a strength of 26% were added in such a manner that the pH-value remained during the reaction at 10 to 11.

Stirring was continued at the indicated temperature, and the potassium salt of ethionic acid-n-dodecyl amide which had precipitated, was finally separated in a good yield. It was then washed with methylene chloride and water.

When the indicated quantities of potassium carbonate and potassium hydroxide were replaced by equivalent quantities of sodium carbonate and sodium hydroxide, the corresponding sodium salt was obtained.

*Example 6*

76 parts of carbyl sulfate were added, during the course of 20 minutes, at 0° to 5° C., while stirring intensely, to a mixture of 9 parts of 1,4-diaminobutane, 50 parts of water, and 100 parts by volume of ethylene chloride. By simultaneously adding 157 parts of a potassium hydroxide solution of 26% strength, the pH-value of the mixture was kept during the reaction at 11 to 12. After termination of the addition of carbyl sulfate, the reaction mixture was stirred for a further 30 minutes at a temperature in the range from 0° to 5° C. No precipitation occurred. Besides the potassium salt of ethionic acid, the aqueous phase also contained the dipotassium salt of N,N'-(1,4-butylene)-bis-(ethionic acid amide).

*Example 7*

42 parts of n-hexylamine were added during the course of 10 minutes, at 40° to 45° C., while stirring intensely, to a mixture of 38 parts of carbyl sulfate and 120 parts of ethylene chloride. After termination of the addition of hexylamine, the reaction mixtures was stirred for a further 1½ hours at 40° C. and, after it has cooled to 10° C. to 12° C., 300 parts of water were stirred in.

After separation of the ethylene chloride phase and removal of the solvent by distillation under reduced pressure, there was obtained as residue the n-hexylamine salt of N-n-hexylethionic acid amide.

*Example 8*

9.5 parts of carbyl sulfate were added, during the course of 15 minutes, at 20° to 25° C., while stirring intensely, to a mixture of 10.0 parts of 1,12-diaminododecane, 50 parts of water, and 50 parts by volume of ethylene chloride. After a further stirring for 15 minutes at the indicated temperature, the precipitated inner salt of N-(12-amino-dodecyl)-ethionic acid amide was separated.

*Example 9*

9.5 parts of carbyl sulfate were added, during the course of 10 minutes, at a temperature in the range from 23° to 28° C., while stirring intensely, to a solution of 27.4 parts of N-methylstearylamine in 180 parts by volume of ethylene chloride. The reaction mixture was further stirred for 30 minutes at 30° C., and, after it had cooled to 3° C., the N-methylstearylamine salt of N-methyl-N-stearylethionic acid amide was separated in a good yield from the clear solution.

Example 10

81 parts of methyl-carbyl sulfate (prepared from propylene) were added, at 0° to 5° C., while stirring, to a mixture of 24.2 parts of N-methylbenzylamine, 50 parts of water, 100 parts by volume of ethylene chloride and 14 parts of potassium carbonate. By simultaneously adding 164 parts of an aqueous potassium hydroxide solution of 25.5% strength, the pH-value was kept at 10 to 11. After a further stirring for 30 minutes at 0° to 5° C., the precipitated potassium salt of N-methyl-N-benzylmethylethionic acid amide was separated by suction-filtration.

Example 11

50 parts of dimethyl-carbyl sulfate (prepared from butene-2) were added, at a temperature in the range from 0° to 5° C., while stirring, to a mixture of 12.1 parts of N-methylbenzylamine, 50 parts of water, 100 parts by volume of ethylene chloride, and 7 parts of potassium carbonate; by simultaneous addition of 60.5 parts of an aqueous potassium hydroxide solution of 25.5% strength, the pH-value of the reaction mixture was kept at 10 to 11. Precipitation took place after standing of the reaction mixture for some hours. Upon cooling of the reaction mixture to 5° C., the precipitated potassium salt of N-methyl-N-benzyldimethylethionic acid amide was separated.

Example 12

50 parts of n-hexylamine were dissolved at a temperature in the range from 0° to 5° C., in 250 parts by volume of ethylene chloride. 50 parts of dimethyl-carbyl sulfate were added at the same temperature, during the course of about 30 minutes, while stirring. Stirring was continued for a further 30 minutes at 0° to 5° C., then the temperature was raised to about 20° C. and the mixture was stirred for half an hour with 200 parts of water. After separation of the ethylene chloride phase and removal of the solvent by distillation under reduced pressure, the n-hexylammonium salt of N-n-hexyldimethylethionic acid amide remained behind in good yield and in the form of a viscous oil.

Example 13

60 parts of methyl-carbyl sulfate were added, during the course of about 30 minutes, at a temperature in the range from 0° to 5° C., to a mixture of 50 parts of water, 50 parts by volume of ethylene chloride, and 20.2 parts of n-hexylamine, during which time the pH-value was kept at 11 by dropwise adding 99.5 parts of KOH of 25.5% strength. Stirring was continued for one hour at 5° C. and then the aqueous phase, which contained the potassium salt of N-n-hexylmethylethionic acid amide, was separated.

Example 14

60 parts of methyl-carbyl sulfate were added, at a temperature in the range from 0° to 5° C., to a mixture of 11.6 parts of 1,6-diaminohexane, 50 parts of water, and 100 parts by volume of ethylene chloride. During the addition of the methyl-carbyl sulfate, the pH-value was kept at 11 by simultaneously adding 99 parts of a potassium hydroxide solution of 25.5% strength. Stirring was continued for a further 30 minutes at 20° to 30° C. After cooling to 0°, no crystallization occurred. The aqueous phase contained the dipotassium salt of N,N'-(1,6-hexylene)-bis-(methylethionic acid amide).

The aqueous solutions obtained according to Examples 13 and 14 can directly be used for further reactions.

Example 15

520 parts of carbyl sulfate were added portionwise, at a temperature in the range from 0° to 5° C., while stirring, to a mixture of 60 parts of ethylenediamine, 300 parts of water, and 780 parts of ethylene chloride, and by simultaneously adding about 890 parts of an aqueous potassium hydroxide solution of 25.6% strength, the pH-value was maintained at 11. After termination of the addition (about 1½ hours), the mixture was further stirred for 1 hour, at 0° to 5° C. By the addition of about 30 parts of semi-concentrated hydrochloric acid, the pH-value of the mixture was adjusted to 7 and the precipitated dipotassium salt of 1,2-bis-(ethionylamino)-ethane was separated, washed with 250 parts of ethylene chloride and 160 parts of ethanol and dried under reduced pressure to constant weight (the yield amounted to 50% of the theoretical yield, referred to ethylenediamine, and the degree of purity was higher than 90%). The aqueous phase contained 25% of the dipotassium salt of 1,2-bis-(ethionylamino)-ethane, referred to the theoretical yield.

The dipotassium salt could be recrystallized from aqueous methanol of 70% strength.

We claim:

1. A process for the manufacture of ethionic acid amides which comprises reacting, at a pH of 7 to 14 and in the presence of water and of an acid-binding agent, a compound of the formula

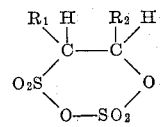

wherein $R_1$ and $R_2$ each represent a member selected from the group consisting of hydrogen and lower alkyl, with an amine of the formula

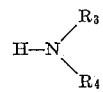

wherein $R_3$ represents a member selected from the group consisting of hydrogen and alkyl having 1 to 18 carbon atoms, $R_4$ represents a member selected from the group consisting of alkyl having 1 to 18 carbon atoms, cyclohexyl, benzyl, and

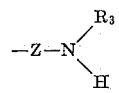

wherein Z represents an unsubstituted alkylene group having 2 to 12 carbon atoms, and wherein $R_3$ and $R_4$ together with the nitrogen atom form a member selected from the group consisting of piperidino, piperazino, morpholino, tetrahydroquinolino, and lower alkoxy tetrahydroquinolino.

2. A process as claimed in claim 1, wherein the reaction is carried out in the range of −20° C. and +100° C.

3. A process as claimed in claim 1, wherein the reaction is carried out in the range of −5° C. and +60° C.

References Cited

UNITED STATES PATENTS 2,229,744 1/1941 Kern _____ 260—457
2,666,788 1/1954 Ebel _____ 260—458

OTHER REFERENCES

Auslegeschrift 1,175,226, October 1964.
Auslegeschrift 1,179,198, October 1964.

ALEX MAZEL, Primary Examiner.

JOSE TOVAR, Assistant Examiner.